(No Model.)
A. W. TOOLEY.
FEED BAG.
No. 587,468. Patented Aug. 3, 1897.
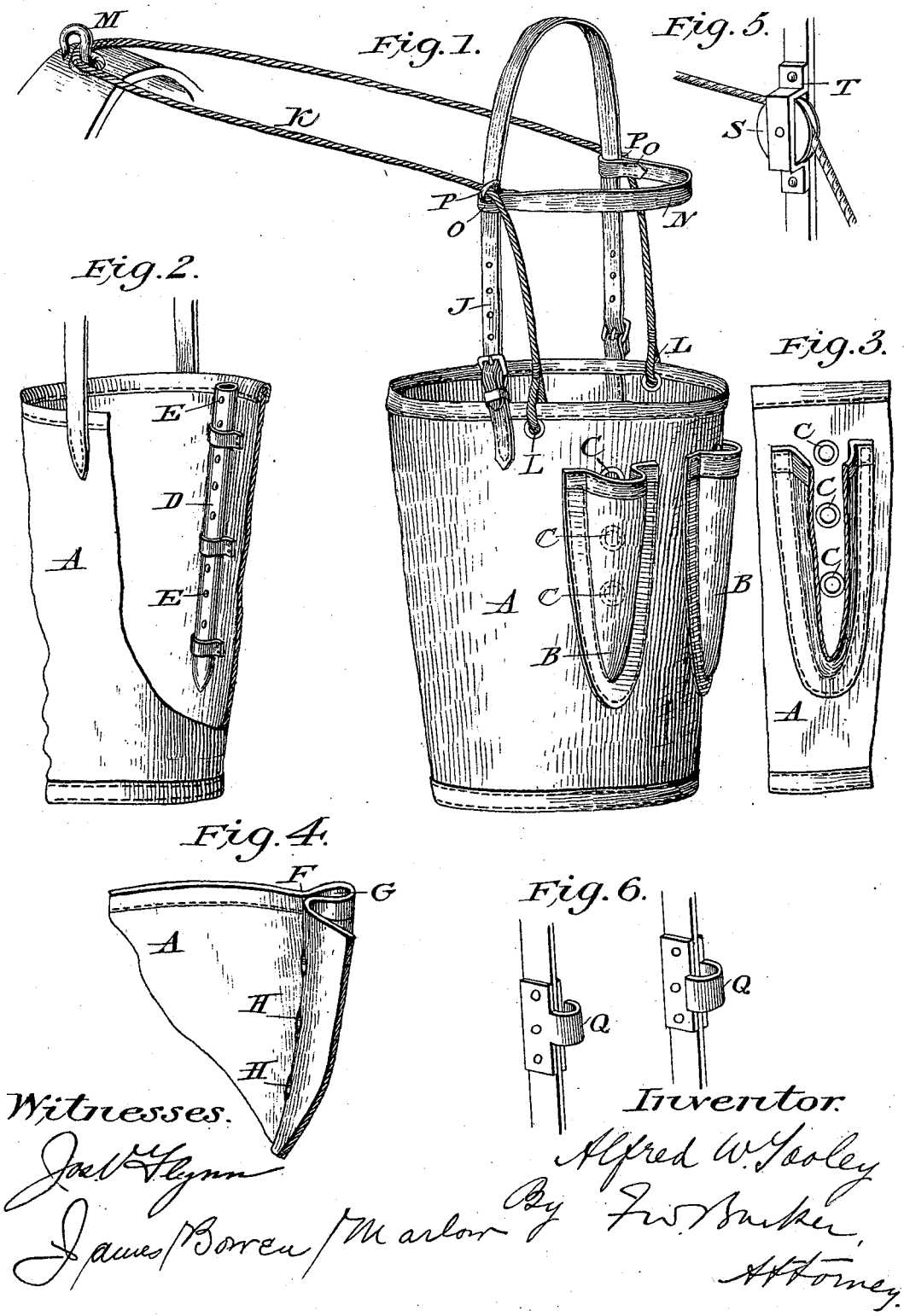
Witnesses.
Inventor.
Alfred W. Tooley

UNITED STATES PATENT OFFICE.

ALFRED WILLIAM TOOLEY, OF BEDFORD, ENGLAND.

FEED-BAG.

SPECIFICATION forming part of Letters Patent No. 587,468, dated August 3, 1897.

Application filed February 10, 1896. Serial No. 578,777. (No model.)

*To all whom it may concern:*

Be it known that I, ALFRED WILLIAM TOOLEY, a subject of the Queen of Great Britain and Ireland, and a resident of 12 Market Place, Leighton Buzzard, Bedford, England, have invented certain new and useful Improvements in Feed or Nose Bags, of which the following is a full, clear, and exact specification.

The objects of my invention are the provision of a bag having the advantages of lightness, cheapness, and durability and in providing a bag having an efficient means of ventilation and that at the same time shall be perfectly waterproof, so that it can be used for drinking purposes, thus providing a light and portable utensil for watering horses as well as for feeding.

A further object of my invention is to provide means for keeping said nose or feed bag off the ground when in use for feeding purposes, and also to allow free use of the same till the whole of the contents are consumed.

It is well known that the ordinary feed or nose bag is liable to injury from continually coming in contact with the ground, especially when the bag is nearly empty and the animal seeks to get at the remaining contents of the bag. The general result is that the bag is placed on the ground and the bottom doubles over, so that the remaining food is folded up with it, and the lower part of the bag, besides being very much soiled, is soon worn away. This invention entirely removes these objections by keeping the bottom free from dirt and from wear and tear, besides enabling the animal to get at the whole of the contents till all is used.

In order to carry my invention into practice, I provide a bag made of canvas, cocoanut matting, or any suitable material and lined with india-rubber or coated with an india-rubber solution, so that the whole of the bag inside may be rendered absolutely waterproof, and thus may insure the protection of the food from wet or enable the bag to contain water or liquid and be used for watering purposes. It is obvious, however, that while being available for containing water or liquid of any kind said bag would be without any ventilation and therefore would be unsuitable for feeding purposes. In order to overcome this objection and render said bag available for both purposes, I fix on the inside of the bag a tube or tubes made of india-rubber or other suitable material, said tube or tubes continuing from the upper edge of the bag down to a convenient position in its side, each tube having holes made at various distances along its length, or I provide a tube or tubes by sewing or otherwise forming a portion of the side of the bag into the shape of a tube, or I adopt a further plan and provide in one or more positions in the side of the bag a series of holes or perforations of any convenient shape, number, and size from the upper portion of the bag down to a convenient position in its side and sew or otherwise fix over said holes or perforations a strip of waterproof material in such a way that a water-tight tube or channel is provided, so that the air may have free access from the top of the outside of the bag through the aforesaid holes or perforations into the inside of the bag, thus giving free ventilation and at the same time rendering the bag perfectly water-tight.

I provide a cord or chain the two ends of which are attached by means of loops or any other convenient means of attachment, either permanently or removable, to the top of the bag, one end on each side of the bag and preferably in front of the ordinary hanging-strap. This cord or chain passes up the sides of the animal's head and is suspended from the hook of the bearing-rein or other similar convenient part of the harness and is of sufficient length to allow the animal to lower its head to a convenient distance above the ground, but not beyond that distance.

It will be readily understood that besides being hung from the animal's head in the usual manner the bag by means of my invention is also suspended independently of the animal's head by means of the aforesaid cord or chain, as hereinbefore described, and thereby as the contents of the bag are used up and the animal seeks to get at the bottom the bag is held up by the cord or chain.

I further provide a short strap which passes in front of the head and terminates in loops, through which the ordinary bag-strap is passed, said short strap serving to keep the bag from slipping along the animal's neck, or in place of said short strap a metal clip may be provided fixed to the strap of the bag and arranged so as to clip the head-piece or other convenient part of the bridle, so that in the same manner the strap of the bag is prevented from slipping along the animal's neck, and I also further provide swivel eyes or rings, or, if preferred, small pulleys revolving in brackets attached one on either side of the head to each loop of aforesaid short strap for the purpose of guiding the aforesaid cord or chain and keeping it in position on the side of the head.

If preferable, the aforesaid short strap may be dispensed with and the eyes, rings, or pulleys may be attached to the head-piece of the harness. The suspension cord or chain aforesaid may be made adjustable for length.

Referring to the drawings, which form a part of this specification, Figure 1 is a bag provided with means of ventilation and also for suspending the bag so as to be kept clear from the ground, as hereinbefore described. Fig. 2 shows a section of the bag provided with india-rubber tubes having perforated holes. Fig. 3 shows a portion of a bag provided with holes or perforations in the side of the bag, as illustrated also in Fig. 1, with the strip of waterproof material (shown partly broken away) for covering said holes. Fig. 4 shows a further modification of ventilating arrangement by sewing or otherwise forming a portion of the side of the bag together into the shape of a tube, and Fig. 5 shows an alternative arrangement for guiding the suspending cord or chain by means of a small pulley revolving in a bracket. Fig. 6 shows the alternative arrangement of providing clips in place of aforesaid short strap.

In the several views the same letters refer to the same parts in the respective illustrations.

A is the bag, made of suitable material and lined with india-rubber or waterproof solution, by which the whole of the bag is rendered waterproof.

B B are the strips or pieces of waterproof material, sewed or otherwise fixed over the holes C C C, made in the side of the bag.

D is the alternative plan of providing a tube fixed to the inside of the bag, said tube having perforations E E, as hereinbefore described.

F shows the plan adopted of sewing the side of the bag into the form of a tube at G, the tube thus formed being provided with perforations at H H, if required.

J is the ordinary strap for suspending the bag from the animal's head.

K is the suspending cord or chain, attached to the bag at L L and which is suspended at the hook of the bearing-rein or other suitable position at M.

N is the short strap, passing in front of the head and terminating in loops O O, through which the strap J passes.

P P are swivel-rings, preferably attached to aforesaid loops or to any adjacent part of the harness, through which the cord or chain K is threaded and freely slides; or these swivel rings or eyes may be substituted by small pulleys S, revolving in brackets T, fixed to aforesaid strap or other convenient part of the harness.

Q Q show the clips used in place of short strap N.

Having now described my invention, what I claim as new, and desire to secure by Letters Patent, is—

1. A feed-bag for horses capable of containing dry or liquid food, and means within said bag for conveying air to the interior thereof, substantially as set forth.

2. In combination, a feed-bag, an air-tube extending vertically and secured against the inner side of said bag, said tube being closed at its lower end, open at its upper end, and having apertures along its length, communicating only with the interior of the bag, together with a suspending-strap connected to the bag, guideways upon said strap, and a cord passing through said guideways and connected to the bag, the said cord being connected to a portion of the harness, substantially as set forth.

3. A feed-bag having perforations to supply air to the interior thereof, and means enabling the air to be received at a point adjacent to the top of said bag, and to be conveyed to the interior of the bag at various lower points, substantially as set forth.

In witness whereof I have hereunto set my hand in presence of two witnesses.

ALFRED WILLIAM TOOLEY.

Witnesses:
REGINALD WALTER BARKER,
EDWARD J. WITCHELL.